J. MORRIS.
Domestic Boiler.
No. 447. Patented Oct. 28, 1837.
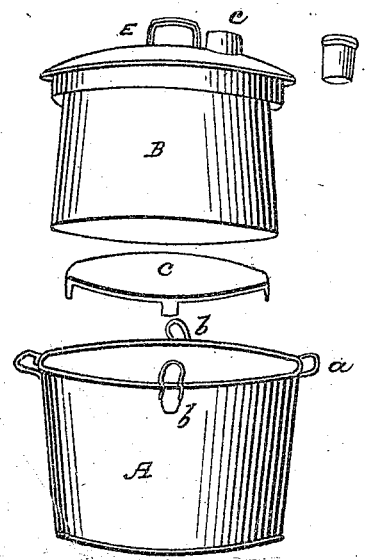
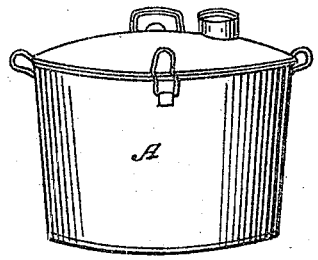
SIGNATURES OF
WITNESSES LOST
INVENTOR.
John Morris

UNITED STATES PATENT OFFICE.

JOHN MORRIS, OF DERBY, CONNECTICUT.

STEAM VESSEL FOR COOKING.

Specification of Letters Patent No. 447, dated October 28, 1837.

*To all whom it may concern:*

Be it known that I, JOHN MORRIS, of Derby, in the county of New Haven and State of Connecticut, have invented a new and useful machine for cooking, which I call "Morris' Steam Vessel for Cooking," and I hereby declare that the following is a full and exact description thereof, observing that the nature and principle of my invention consists in forming a steam chamber for cooking with a double case so as to admit a column of air between them, and in placing the food to be cooked within the inner chamber which receives the steam direct from the boiling water and being surrounded by a column of hot air. The steam is prevented from condensing and by arming this chamber with a safety-valve of peculiar and simple construction all danger of explosion is prevented.

To enable others skilled in the art to make and use my invention, I describe its construction and operation as follows.

As the size may vary according to the use intended, I will describe one of medium size for the use of ordinary private families. The outward shell or case (A No. 1.) of this size, is about twelve inches in diameter at the bottom, the sides rising about 10 inches in height and flaring one and a half inches to the top—with a handle *a, a*, on each side or a coil. This outward shell or case resembles a pail when round, but it may be square or of any other form. On the bottom of this outward shell or case I place a stand C, on legs about 2 inches high, to receive and support above the water, the articles to be cooked. This stand is shaped like the bottom, but in diameter one or two inches less. The inner vessel or shell B, is open at the bottom, and is usually of the same diameter throughout as the bottom of the outer shell, the sides rising perpendicularly or inclining inward; and is closed on the top by a double plated cover E, having a lip to shut close upon the top of the outer shell—so that when the inner vessel or shell is in place, the open bottom of it, will inclose the stand and sit tight upon the bottom and around the sides of the outer shell, at the bottom, leaving a space between the two shells increasing from the bottom, where they unite, to the top, where the space is closed by the lip of the double cover. Through this double cover I place a safety valve D; the opening for the valve in the lower plate of the cover should be about ¾ of an inch in diameter, and be surrounded by a tube made fast to the plate ½ inch in diameter, which tube passes from the lower plate through the upper plate of the cover. In this tube I place a loose plug of solid metal, armed at the bottom with cork or other suitable substance for a valve which is to rest on the shoulders of the orifice in the lower plate of the cover. This machine may be constructed of tin, of copper or iron tinned, or of any other metal or material proper to be used in cooking.

The several parts above described are put together for use and appear as at A No. 2, and operate in the following manner. The stand is placed within, and on the bottom of the outer shell or case, and water one or 2 inches deep is placed under it. The food to be cooked is put upon the stand. The inner shell with its cover attached is then put in place, so as to inclose the stand and whatever is placed upon it, the lower edge passing through the water and resting on the bottom, and thus forming a tight steam chamber. The machine is then put over the fire, either in a common fire place, in a stove, or on a cooking furnace and the cooking is performed by the steam rising from the water within the inner chamber or vessel. This inner vessel is held in place by clasps *b, b* attached to the outer shell, or may be fastened to its place in any other suitable manner and is guarded against explosion by the safety valve above described and uniformity of heat is preserved by the column of air between the shells.

The great advantages of this invention are the simplicity of the machinery and arrangements by means of which the process of cooking by steam may be easily and safely managed by any person, also the great saving of fuel in cooking and I may add the great excellence of cooking most articles by steam.

For further illustration I refer to the drawings with references accompanying this specification.

What I claim as my invention and desire to secure by Letters Patent is—

The manner of constructing the machine or vessel for cooking by steam and the several parts thereof combined as above specified and described.

Dated June 6th 1837.

JOHN MORRIS.

Witnesses:
SIMEON BALDWIN,
ANDREW JOHNSON.